Patented Apr. 27, 1943

2,317,463

UNITED STATES PATENT OFFICE 2,317,463

VULCANIZATION OF RUBBER

Paul C. Jones, Akron, Ohio, assignor to The B. F. Goodrich Company, New York, N. Y., a corporation of New York No Drawing. Application May 10, 1940,
Serial No. 334,389

14 Claims. (Cl. 260—785)

This invention relates to the vulcanization of rubber, and has as its principal object to provide vulcanized rubber compositions which retain their desirable properties for unusually long periods of time when subjected to fatigue tests more severe than those by which the quality and longevity of vulcanized rubber are ordinarily determined.

It has been common practice to retard the deterioration of rubber by incorporating therein diarylamines, phenolic compounds, certain aldehyde-amine reaction products, and other materials commonly called "antioxidants." These antioxidants have ordinarily been rather specific in their action, however. Thus one antioxidant may be employed to retard the drop in tensile strength of vulcanizates due to oxidation, while another type of antioxidant may be employed to retard the cracking of vulcanizates which are subjected to repeated flexing. The use of antioxidants is a remedial rather than a corrective measure, for the purpose is to preserve a vulcanizate having a tendency to deteriorate rather than to produce vulcanizates which even in the absence of antioxidants have increased resistance to deterioration.

I have discovered that by following certain compounding principles hereafter disclosed, vulcanizates are produced which exhibit excellent resistance to all kinds of severe fatigue tests. The vulcanizates of this invention not only maintain their tensile strengths for long periods of time when subjected to bomb aging in oxygen and air and oven aging in air, but they also may be flexed for a long time without cracking, and they exhibit excellent resistance to abrasion.

In general, the compositions of this invention are vulcanized with the aid of at least two types of accelerators of vulcanization in the presence of a fatty acid, zinc oxide, and small amounts of available sulfur. Specifically, the vulcanization is accelerated by a 2-mercaptothiazoline or the zinc salt thereof, and a polysulfide accelerator liberating, under vulcanizing conditions, sulfur available for vulcanization, or a related non-vulcanizing accelerator such as a N,N'-monothioamine, a thiuram monosulfide, or a zinc dithiocarbamate.

The structural formula of the class of compounds known as 2-mercaptothiazolines contains the configuration

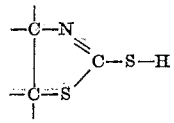

wherein hydrogen or organic radicals are attached to the carbon atoms. While in the preferred embodiment of this invention 2-mercaptothiazoline or its zinc salt is employed, such compounds as 2 - mercapto - 4 - methylthiazoline, 2 - mercapto- 5 - methylthiazoline, 2 - mercapto - 4 - methoxymethylthiazoline, 2-mercapto-4-phenylthiazoline, 2-mercapto-4-chlormethylthiazoline, 2 - mercapto - 4 - (p-amino)phenylthiazoline, 2 - mercapto-4,4-diethylthiazoline, 2-mercapto - 4,5-tetramethylenethiazoline, and their zinc salts may also be employed. At least about 2% of one of the above accelerators is ordinarily incorporated in the rubber composition prior to vulcanization. This percentage and all the percentages in this specification and the appended claims are based on the weight of the rubber used.

The second accelerator may be any polysulfide accelerator which decomposes with the liberation of sulfur under vulcanizing conditions. As examples may be mentioned tetramethyl thiuram disulfide, tetraethyl thiuram disulfide, tetraphenyl thiuram tetrasulfide, tetracyclohexyl thiuram disulfide, dipiperidylthiuram tetrasulfide, N,N'-trithiodiethylamine, N,N'-dithiodiethylamine, N,N'-tetrathiomorpholine, N,N'- trithio-n-butylamine, and other thiuram polysulfides and N,N'-polythioamines. Instead of accelerators which liberate sulfur under vulcanizing conditions, related non-vulcanizing accelerators such as tetramethyl thiuram monosulfide, N,N' - monothiodiethylamine, zinc dimethyldithiocarbamate, and other thiuram monosulfides, N,N' - monothioamines, and zinc dithiocarbamates may be employed. A sulfur-liberating accelerator or small amounts of free sulfur are employed in compositions wherein the second accelerator is non-vulcanizing. At least .5% of one of the above-enumerated types of accelerators is ordinarily employed.

To form vulcanizates having the superior characteristics herein described, it is necessary that the compositions be vulcanized in the presence of a fatty acid. The necessity for the use of fatty acids in connection with thiazoline accelerators is explained in my copending application Serial No. 255,358 filed February 8, 1939. For the purposes of this invention, substantial amounts of fatty acid should be employed to obtain the best results. Thus, compositions containing from about 3% to 5% of lauric or stearic acid may be cured to produce vulcanizates which resist aging to a much greater extent than the vulcanizates formed from compositions containing no fatty acid. As will be shown hereafter, however, even 1% of fatty acid is sufficient in some cases to produce vulcanizates having excellent resistance to deterioration. The zinc salts of the fatty acids function in the same manner as the fatty acids themselves and may be employed interchangeably therewith. When the fatty acids are combined with zinc and 2-mercaptothiazolines to form accelerators with a structural formula containing the configuration

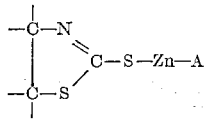

wherein A is a fatty acid group, it is not necessary to include additional fatty acid in the composition.

It is also essential for the production of vulcanizates having the superior properties of those herein described that the compositions be vulcanized in the presence of zinc oxide. The amount of zinc oxide may be varied over an exceedingly wide range, 3% or even less being ordinarily sufficient, while 100% and more may be employed if desired.

The vulcanizates of this invention are all cured in the presence of a small amount of available sulfur, as, for example, not over about 1% based on the rubber. In calculating the amount of sulfur available for vulcanization, account is taken of both the added free sulfur and the sulfur which will be liberated under vulcanizing conditions from any polysulfide accelerators present. Thus, tetramethyl thiuram disulfide liberates 13.3% of its weight of sulfur and dipiperidyl thiuram tetrasulfide liberates 25% of its weight of sulfur during vulcanization. If 1% of the latter accelerator were employed, there would be .25% available sulfur in the composition. If, in addition, .1% of free sulfur were employed, there would be .35% available sulfur in the composition. When employing the compounding principles herein set forth, unusually small amounts of available sulfur are required to effect complete vulcanization. The preferred amounts of total available sulfur present are from about .1% to .5%. As is usual in low-sulfur compositions, the total accelerator concentration should be relatively high, ranging from about 2.5% to 5% or over.

Another factor which influences the behavior of vulcanizates under severe fatigue tests is the type of rubber employed. Although the success of this invention is not dependent upon the use of any particular kind of rubber, the observations of the prior art that vulcanizates prepared from thermally plasticized rubber have better properties as regards deterioration than vulcanizates prepared from rubber plasticized by intensive mastication are equally applicable here.

As examples of combinations of accelerators and sulfur which may be employed in rubber compositions containing zinc oxide and fatty acid or zinc salt thereof, the following may be given, it being understood that the total amount of available sulfur is not over about 1%.

1. A 2-mercaptothiazoline, a thiuram monosulfide, and sulfur.
2. A zinc salt of 2-mercaptothiazoline, a thiuram monosulfide, and sulfur.
3. A 2-mercaptothiazoline, and a thiuram polysulfide.
4. A 2-mercaptothiazoline, a thiuram polysulfide, and a zinc dithiocarbamate.
5. A 2-mercaptothiazoline, a thiuram monosulfide and a thiuram polysulfide.
6. A 2-mercaptothiazoline, a thiuram polysulfide and sulfur.
7. A 2-mercaptothiazoline and a N,N'-polythioamine.
8. A 2-mercaptothiazoline, a N,N'-monothioamine, and sulfur.
9. A 2-mercaptothiazoline, a N,N'-polythioamine, and a thiuram monosulfide.
10. A 2-mercaptothiazoline, a zinc dithiocarbamate, and sulfur.
11. A 2-mercaptothiazoline, a N,N'-polythioamine, and a zinc dithiocarbamate.

As a specific example of one application of the compounding principles of this invention, insulation compositions adapted to be extruded around electric conductors and cured in a short time were prepared as follows:

| Composition | 1 | 2 | 3 | 4 | 5 | 6 | 7 | 8 | 9 | 10 |
|---|---|---|---|---|---|---|---|---|---|---|
| Rubber | 100 | 100 | 100 | 100 | 100 | 100 | 100 | 100 | 100 | 100 |
| Zinc oxide | 85.65 | 85.65 | 85.65 | 85.65 | 85.65 | 85.65 | 85.65 | 85.65 | 85.65 | 85.65 |
| Clay | 64.75 | 65.75 | 64.75 | 64.75 | 64.75 | 64.75 | 64.75 | 64.75 | 64.75 | 64.75 |
| Whiting | 14.28 | 14.28 | 14.28 | 14.28 | 14.28 | 14.28 | 14.28 | 14.28 | 14.28 | 14.28 |
| Gas black | 2.86 | 2.86 | 2.86 | 2.86 | 2.86 | 2.86 | 2.86 | 2.86 | 2.86 | 2.86 |
| Paraffin | 5.71 | 5.71 | 5.71 | 5.71 | 5.71 | 5.71 | 5.71 | 5.71 | 5.71 | 4.71 |
| Magnesia | .714 | .714 | .714 | .714 | .714 | .714 | .714 | .714 | .714 | .714 |
| Antioxidant | 5.71 | 5.71 | 5.71 | 5.71 | 5.71 | 5.71 | 5.71 | 5.71 | 5.71 | 5.71 |
| Fatty acid | 5.0 | 5.0 | 5.0 | 5.0 | 5.0 | 3.0 | .714 | 5.0 | 5.0 | 5.0 |
| Sulfur | .3 | 0 | .179 | 0 | 0 | 0 | 0 | 0 | 0 | .179 |
| 2-mercaptothiazoline | 3.0 | 3.0 | 4.25 | 0 | 3.0 | 3.5 | 4.25 | 4.5 | 0 | 0 |
| Zinc salt of 2-mercaptothiazoline | 0 | 0 | 0 | 4.25 | 0 | 0 | 0 | 0 | 4.5 | 4.7 |
| Tetramethyl thiuram monosulfide | 2.0 | 0 | 0 | 0 | 0 | 1.1 | 0 | 0 | 0 | 0 |
| Tetramethyl thiuram disulfide | 0 | 2.0 | .75 | .75 | 0 | 0 | 0 | 0 | 0 | 0 |
| Dipiperidyl thiuram tetrasulfide | 0 | 0 | 0 | 0 | 0.4 | 0.4 | .75 | .5 | .5 | .3 |
| Zinc dimethyl dithiocarbamate | 0 | 0 | 0 | 0 | 1.6 | 0 | 0 | 0 | 0 | 0 |

These compositions were all vulcanized for 2 min. at 300° F. in standard tensile sheets in a mold, and were then aged for 120 hrs. in a circulating air oven at 250° F. and for 20 hrs. in an air bomb at 260° F. under 80 lbs./sq. in. air pressure. The original tensile strengths and elongations as well as the per cent alteration upon aging are reproduced in the following table:

| Composition | Original | | Per cent alteration after aging | | | |
|---|---|---|---|---|---|---|
| | T | E | Air oven | | Air bomb | |
| | | | T | E | T | E |
| 1 | 1320 | 525 | +5.3 | −21.9 | +20.5 | −20.0 |
| 2 | 1480 | 555 | −5.4 | −17.1 | +17.6 | −22.5 |
| 3 | 1010 | 500 | +18.8 | −10.0 | +8.9 | −2.0 |
| 4 | 1300 | 560 | +8.5 | −25.0 | +16.9 | −7.1 |
| 5 | 1580 | 535 | −5.7 | −17.8 | +4.4 | −20.5 |
| 6 | 1420 | 530 | −24.8 | −18.1 | 0 | −18.9 |
| 7 | 1800 | 525 | −33.3 | −24.8 | −12.8 | −7.6 |
| 8 | 1670 | 545 | −19.8 | −29.3 | −4.2 | −20.2 |
| 9 | 1840 | 510 | −13.6 | −21.6 | −0.5 | −5.9 |
| 10 | 1280 | 530 | +18.7 | −10.4 | +13.3 | −19.8 |

It can be readily seen that these compositions were unusually resistant to aging under these extremely severe conditions. In fact, the tensile strengths were somewhat increased by aging in some cases even though continued curing of the unaged samples beyond 2 min. at 300° F. did not increase the original tensiles.

In another series of tests, the principles of this invention were applied to a composition adapted for use as a tire tread, with outstanding results. The following compositions were employed:

| Composition | 11 | 12 | 13 | 14 | 15 | 16 |
|---|---|---|---|---|---|---|
| Rubber | 100 | 100 | 100 | 100 | 100 | 100 |
| Gas black | 52.5 | 52.5 | 52.5 | 52.5 | 52.5 | 52.5 |
| Pine tar | 1.5 | 1.5 | 1.5 | 1.5 | 1.5 | 1.5 |
| Antioxidant | 1 | 1 | 1 | 1 | 1 | 1 |
| Zinc oxide | 3.5 | 3.5 | 3.5 | 3.5 | 3.5 | 3.5 |
| Stearic acid | 5 | 3 | 1 | 5 | 3 | 3 |
| Sulfur | 0 | 0 | 0 | .25 | .25 | 0 |
| 2-mercaptothiazoline | 3 | 3 | 3 | 3 | 2 | 1 |
| Tetramethyl thiuram disulfide | 2 | 2 | 2 | 0 | 1 | 2 |
| Tetramethyl thiuram monosulfide | 0 | 0 | 0 | 1.75 | 0 | 0 |

These compositions were all vulcanized for 30 min. at 280° F., and were then aged for 96 hrs. in a bomb at 158° F. under a pressure of 300 lbs./in.² of oxygen. The original tensile strengths and elongations as well as the per cent alteration upon aging are reproduced in the following table:

| Composition | Original | | Per cent alteration after aging | |
|---|---|---|---|---|
| | T | E | T | E |
| 11 | 4150 | 610 | −15.2 | −7.4 |
| 12 | 4080 | 625 | −10.1 | −10.4 |
| 13 | 4260 | 640 | −12.4 | −9.4 |
| 14 | 3860 | 600 | −11.1 | −15.0 |
| 15 | 4020 | 605 | −8.8 | −10.7 |
| 16 | 3850 | 610 | −9.1 | −4.7 |

Not only do these vulcanizates exhibit excellent resistance to deterioration as shown by these tests, but they also resist cracking due to flexing for unusually long times, and they possess superior abrasion resistance.

The terms "thioamine" and "sulfide" are employed herein in a generic sense to designate both the mono- and polythio compounds unless specifically restricted to monothioamines, monosulfides, polythioamines, or polysulfides.

It will be understood that the principles herein explained are not limited in their application to the types of composition herein specifically described, but may be applied to any type of rubber composition to produce vulcanizates having unusual resistance to severe fatigue tests. The invention may be employed in the vulcanization not only of ordinary rubber or caoutchouc but also of analogous materials such as synthetic rubber which is capable of vulcanization with sulfur, and these materials are herein designated by the generic term "a rubber." This invention is accordingly not limit to the specific embodiments disclosed, for many other applications of the same principles are within the spirit and scope of the invention as defined in the appended claims.

I claim:

1. The method which comprises vulcanizing a rubber in the presence of a member of the class consisting of fatty acids and their zinc salts, zinc oxide, not over 1% of available sulfur, and a mixture of accelerators, one accelerator being selected from the class consisting of 2-mercaptothiazolines and their zinc salts, and another accelerator being selected from the class consisting of polysulfide accelerators liberating under vulcanizing conditions sulfur available for vulcanization, thiuram sulfides and N,N'-thioamines which do not liberate sulfur under such conditions, and zinc dithiocarbamates.

2. The method which comprises vulcanizing a rubber in the presence of a member of the class consisting of fatty acids and their zinc salts, zinc oxide, about .1% to .5% of available sulfur, and a mixture of accelerators, one accelerator being selected from the class consisting of 2-mercaptothiazolines and their zinc salts, and another accelerator being selected from the class consisting of polysulfide accelerators liberating under vulcanizing conditions sulfur available for vulcanization, thiuram sulfides and N,N'-thioamines which do not liberate sulfur under such conditions, and zinc dithiocarbamates.

3. The method which comprises vulcanizing a rubber in the presence of a member of the class consisting of fatty acids and their zinc salts, zinc oxide, not over 1% of available sulfur, and a mixture of accelerators, one accelerator being selected from the class consisting of 2-mercaptothiazolines and their zinc salts, and another accelerator being a thiuram polysulfide.

4. The method which comprises vulcanizing a rubber in the presence of a member of the class consisting of fatty acids and their zinc salts, zinc oxide, about .1% to .5% of available sulfur, and about 2.5% to 5% of a mixture of 2-mercaptothiazoline and a polysulfide accelerator liberating, under vulcanizing conditions, sulfur available for vulcanization.

5. The method which comprises vulcanizing a rubber in the presence of a member of the class consisting of fatty acids and their zinc salts, zinc oxide, not over 1% of available sulfur, and about 2.5% to 5% of a mixture of accelerators, one accelerator being selected from the class consisting of 2-mercaptothiazolines and their zinc salts, and the other accelerator being a thiuram polysulfide.

6. The method which comprises vulcanizing a rubber in the presence of a member of the class consisting of fatty acids and their zinc salts, zinc oxide, about .1% to .5% of available sulfur, and about 2.5% to 5% of a mixture of accelerators, one accelerator being 2-mercaptothiazoline and another accelerator being selected from the class consisting of polysulfide accelerators liberating under vulcanizing conditions sulfur available for vulcanization, thiuram sulfides and N,N'-thioamines which do not liberate sulfur under such conditions, and zinc dithiocarbamates.

7. The method which comprises vulcanizing a rubber in the presence of a fatty acid, zinc oxide, about .1% to .5% of available sulfur, and about 2.5% to 5% of a mixture of at least 2% of 2-mercaptothiazoline and at least .5% of tetramethyl thiuram disulfide.

8. The method which comprises vulcanizing a rubber in the presence of a fatty acid, zinc oxide, about .1% to .5% of available sulfur, and about 2.5% to 5% of a mixture of at least 2% of 2-mercaptothiazoline and at least .5% of di-piperidyl thiuram tetrasulfide.

9. The method which comprises vulcanizing a rubber in the presence of a fatty acid, zinc oxide, about .1% to .5% of available sulfur, and about 2.5% to 5% of a mixture of at least 2% of the zinc salt of 2-mercaptothiazoline and at least .5% of tetramethyl thiuram disulfide.

10. A vulcanizate prepared by the method of claim 2.

11. A vulcanizate prepared by the method of claim 5.

12. A vulcanizate prepared by the method of claim 7.

13. A vulcanizate prepared by the method of claim 8.

14. A vulcanizate prepared by the method of claim 9.

PAUL C. JONES.

CERTIFICATE OF CORRECTION.

Patent No. 2,317,463. April 27, 1943.

PAUL C. JONES.

It is hereby certified that error appears in the printed specification of the above numbered patent requiring correction as follows: Page 2, in the table following line 51, Column 3 thereof, opposite "Rubber", for "108" read --100--; and Column 2, opposite "Clay", for "65.75 read --64.75--; page 3, second column, line 8, for "limit" read --limited--; and that the said Letters Patent should be read with this correction therein that the same may conform to the record of the case in the Patent Office.

Signed and sealed this 13th day of July, A. D. 1943.

(Seal)

Henry Van Arsdale,
Acting Commissioner of Patents.